US012020468B2

(12) United States Patent
Sakata et al.

(10) Patent No.: US 12,020,468 B2
(45) Date of Patent: Jun. 25, 2024

(54) DEFECT INSPECTION APPARATUS, METHOD AND PROGRAM

(71) Applicant: KABUSHIKI KAISHA TOSHIBA, Tokyo (JP)

(72) Inventors: Yukinobu Sakata, Kawasaki (JP); Kyoka Sugiura, Kawasaki (JP); Ryusuke Hirai, Tokyo (JP); Akiyuki Tanizawa, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 781 days.

(21) Appl. No.: 17/187,031

(22) Filed: Feb. 26, 2021

(65) Prior Publication Data
US 2022/0084185 A1 Mar. 17, 2022

(30) Foreign Application Priority Data

Sep. 16, 2020 (JP) ................. 2020-155434

(51) Int. Cl.
*G06V 10/75* (2022.01)
*G06T 7/00* (2017.01)
*G06T 7/11* (2017.01)

(52) U.S. Cl.
CPC .......... *G06V 10/751* (2022.01); *G06T 7/0002* (2013.01); *G06T 7/11* (2017.01); *G06T 2207/30168* (2013.01)

(58) Field of Classification Search
CPC .............. G06V 10/751; G06V 2201/06; G06T 7/0002; G06T 7/11; G06T 2207/30168; G06T 2207/30148; G06T 7/001
See application file for complete search history.

(56) References Cited

U.S. PATENT DOCUMENTS

| 5,307,421 A * | 4/1994 | Darboux ................. G06T 7/001 |
| | | 382/218 |
| 2008/0072207 A1* | 3/2008 | Verma ....................... G03F 1/84 |
| | | 716/54 |
| 2008/0162061 A1* | 7/2008 | Miyano ..................... G03F 1/84 |
| | | 702/70 |
| 2021/0065344 A1 | 3/2021 | Hirai et al. |

FOREIGN PATENT DOCUMENTS

| JP | 2003-287419 A | 10/2003 |
| JP | 2006-266747 A | 10/2006 |
| JP | 2021-39476 A | 3/2021 |

* cited by examiner

*Primary Examiner* — Samir A Ahmed
(74) *Attorney, Agent, or Firm* — Oblon, McClelland, Maier & Neustadt, L.L.P.

(57) ABSTRACT

According to one embodiment, a defect inspection apparatus includes a storage and a processor. The storage stores dictionary in which a first design image generated by software is associated with a first real image corresponding to the first design image. The processor acquires a second design image generated by the software. The processor searches for a similar first design image similar to the second design image. The processor generates a reference image that is a pseudo real image of a second inspection object, based on the second design data and free of defect, by using the first real image associated with the similar first design image. The first design image includes information of an image area wider than the first real image.

16 Claims, 12 Drawing Sheets

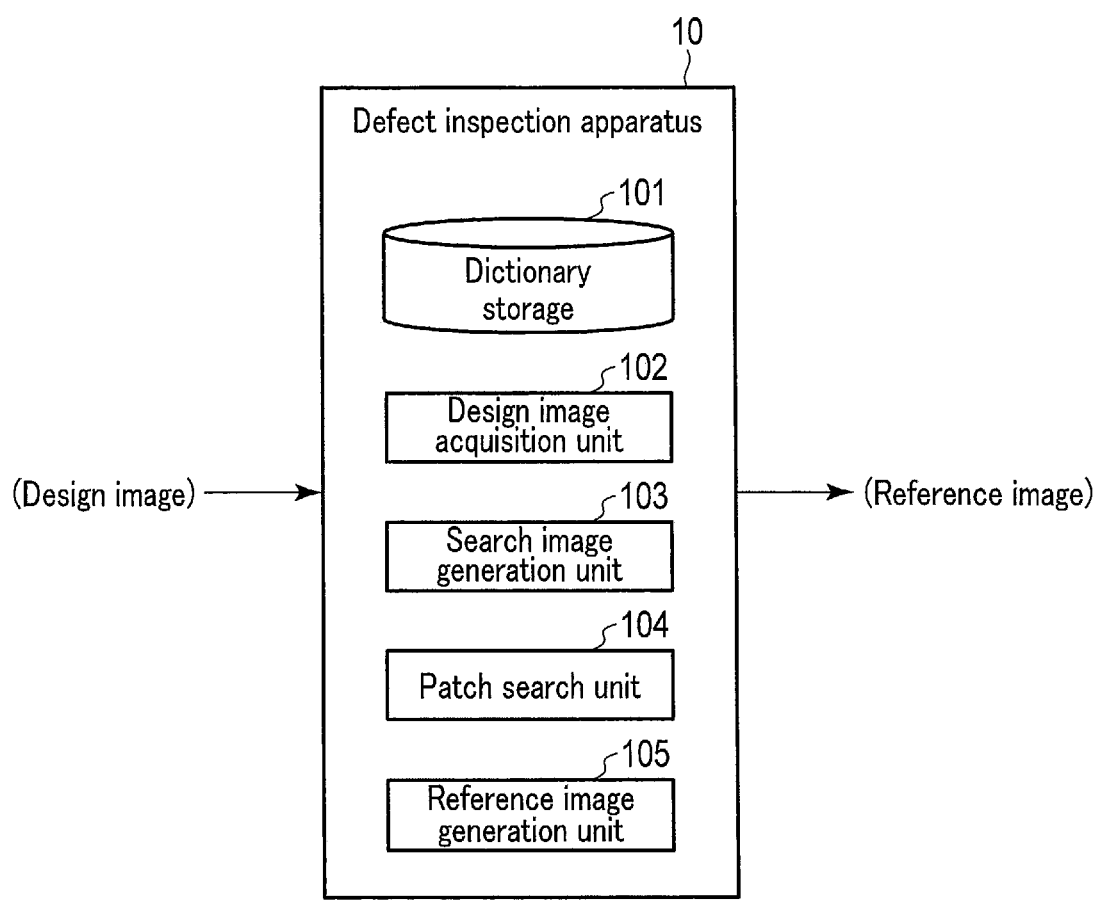
F I G. 1

Image ID:1    Image ID:2

| Image ID | Patch No. | Position | Patch size |
|---|---|---|---|
| 1 (Design) | 0 | (x0, y0) | A |
| 1 (Design) | 1 | (x1, y1) | A |
| 1 (Design) | 2 | (x2, y2) | A |
| ... | ... | ... | ... |
| 2 (Real) | 0 | (x0, y0) | B |
| 2 (Real) | 1 | (x1, y1) | B |

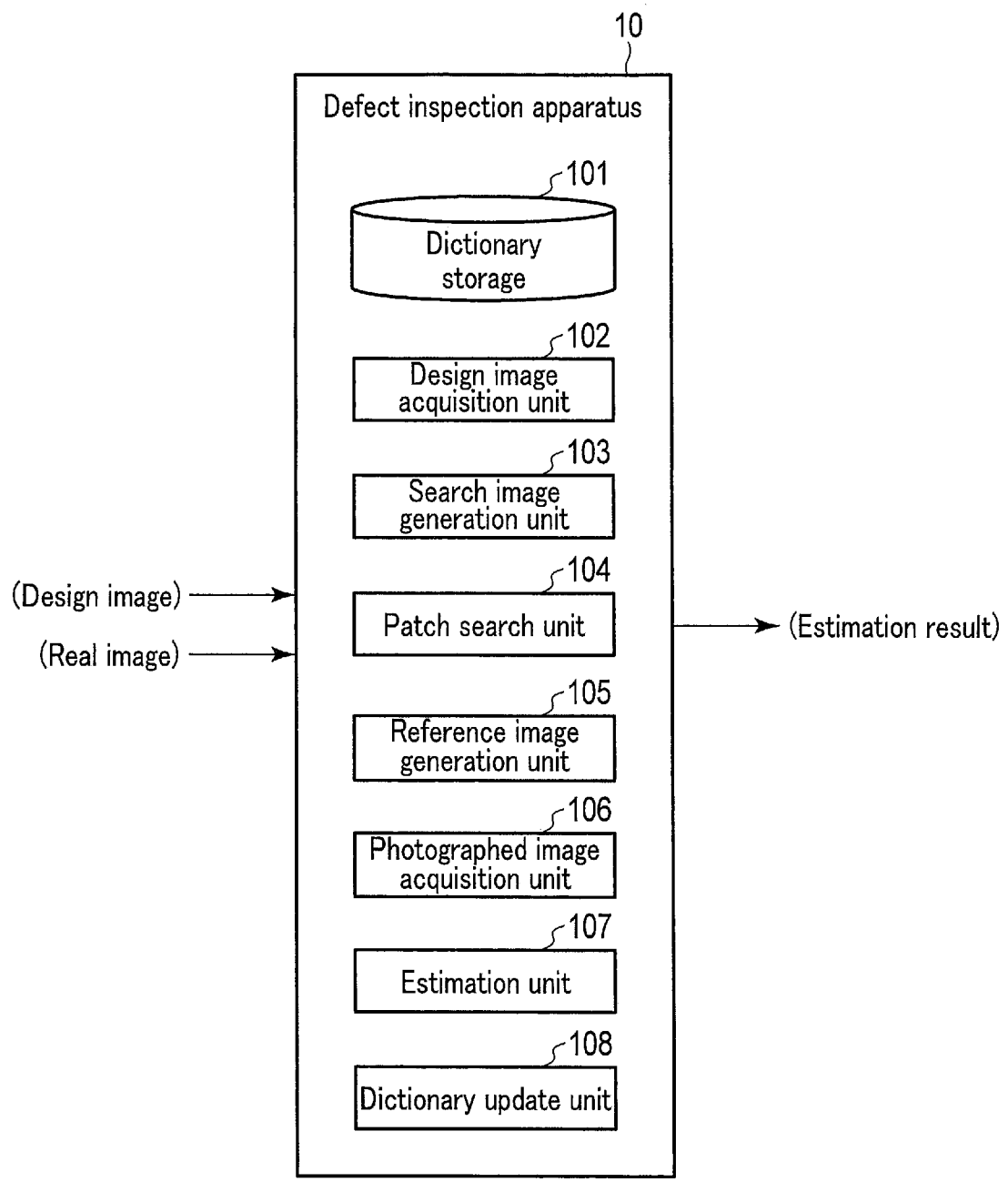
F I G. 14

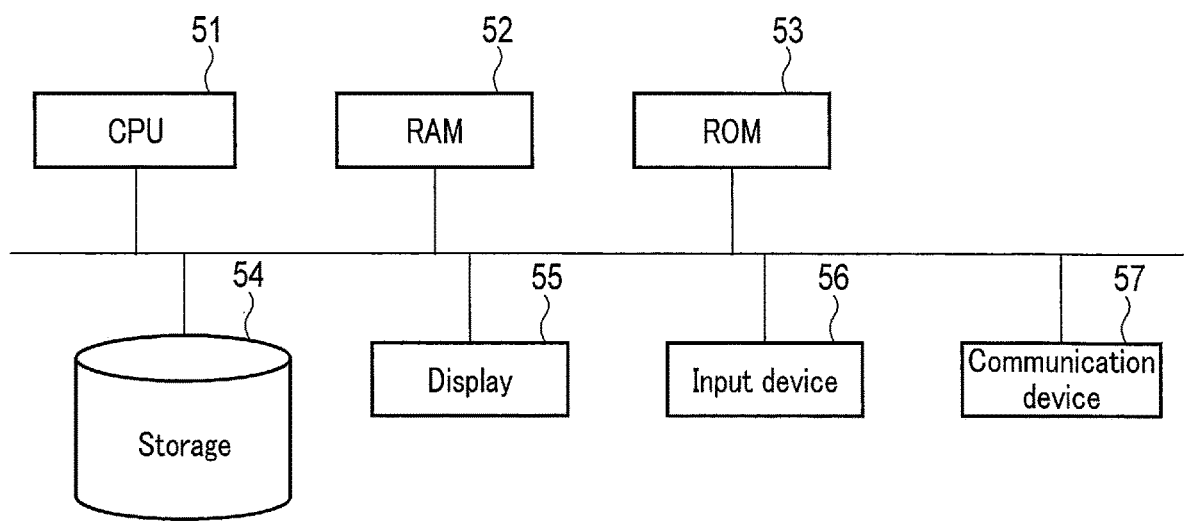
F I G. 15

DEFECT INSPECTION APPARATUS, METHOD AND PROGRAM

CROSS-REFERENCE TO RELATED APPLICATIONS

This application is based upon and claims the benefit of priority from Japanese Patent Application No. 2020-155434, filed Sep. 16, 2020, the entire contents of which are incorporated herein by reference.

FIELD

Embodiments described herein relate to a defect inspection apparatus, method and program.

BACKGROUND

In a process of manufacturing a product based on a circuit pattern of a semiconductor device or the like, a defect inspection is important to suppress reductions in the yield of products. For example, in the process of manufacturing semiconductor devices, a defect inspection called "die-to-database inspection" is generally performed, in which a real image of a circuit pattern is compared with a mask generated in a pseudo manner from the circuit pattern.

In the die-to-database inspection, it is important to generate a mask free of defect.

The mask is generated as follows, for example: a dictionary is prepared, in which a patch image of a design image of a circuit pattern is paired with a patch image of a real image of a product produced based on the circuit pattern. The sizes of the paired patch images are the same, and a patch image of a design image similar to the image of an inspection object is searched for in the dictionary. The patch images of the real image, each paired with the similar design image, are pasted on top of one another to generate a mask. However, the patch images, which are cut out from the real image, are liable to be influenced by patterns around them, depending on an exposure method of the real image and an imaging method. Therefore, even if patch images are similar, if design images from which the patch images are cut have different circuit patterns, the real images having the same size as the design images may be different in luminance or color. In this case, it is difficult to generate an appropriate mask.

BRIEF DESCRIPTION OF THE DRAWINGS

FIG. 1 is a block diagram of a defect inspection apparatus according to a first embodiment.

FIG. 14 is a block diagram of a defect inspection apparatus according to a second embodiment.

FIG. 15 is a diagram showing an example of a hardware configuration of the defect inspection apparatus.

DETAILED DESCRIPTION

Figure 2:
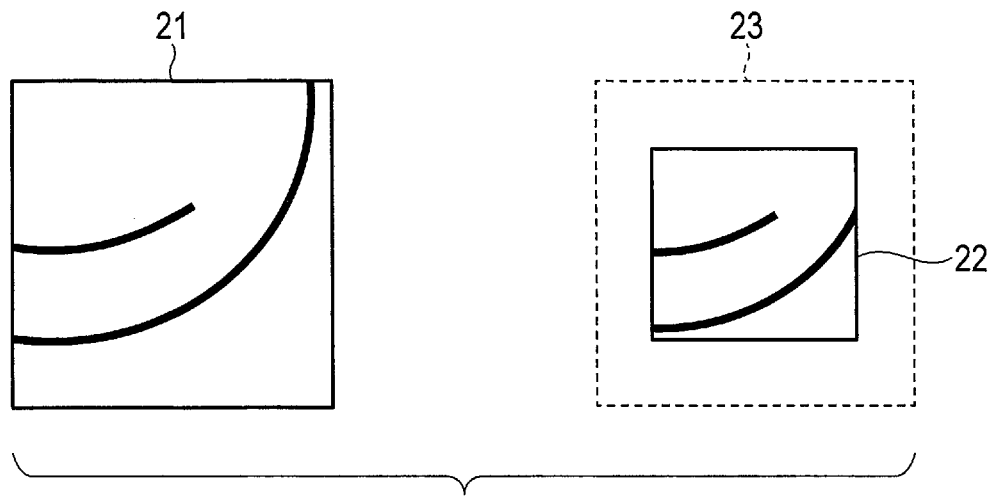
FIG. 2 is a view showing a first example of dictionary data stored in a dictionary storage.

In general, according to one embodiment, a defect inspection apparatus includes a storage and a processor. The storage is configured to store dictionary data in which a first design image based on first design data generated by designing software is associated with a first real image corresponding to the first design image, the first real image being obtained by imaging a first inspection object free of defect and produced based on the first design data. The processor is configured to acquire a second design image based on second design data generated by the designing software. The processor is configured to search for a similar first design image similar to the second design image with reference to the dictionary data. The processor is configured to generate a reference image that is a pseudo real image of a second inspection object, based on the second design data and free of defect, by using the first real image associated with the similar first design image. The first design image includes information of an image area wider than the first real image.

In the following descriptions, a defect inspection apparatus, method and program according to the embodiments will be described with reference to the drawings. In the embodiments described below, elements assigned the same reference symbols are assumed to perform the same operations, and redundant descriptions thereof will be omitted as appropriate.

First Embodiment

An example of a defect inspection apparatus according to the first embodiment will be explained with reference to the block diagram of FIG. 1.

A defect inspection apparatus 10 of the first embodiment includes a dictionary storage 101, a design image acquisition unit 102, a search image generation unit 103, a patch search unit 104, and a reference image generation unit 105.

The dictionary storage 101 stores dictionary data including a plurality of pairs of one or more first design images and corresponding one or more first real images. The first design image is an image based on first design data generated by designing software. The designing software is software used for computer designing, such as computer-aided design (CAD) data. The first real image is obtained by imaging a first inspection object produced based on the first design data, when there is no defect in the first inspection object. The first real image may be, for example, a real image determined as free of defect by either a visual inspection or appearance inspection system. The first design image includes information of an image area wider than the first real images.

The design image acquisition unit 102 acquires a second design image based on second design data, different from the first design data, and generated, for example, externally by the designing software. The second design data is design data of an inspection object product subjected to a defect inspection.

The search image generation unit 103 acquires the second design image from the design image acquisition unit 102, and generates a search image from the second design image. The search image is an image cut from a part of the second design image, and serves as a search key. The search image generation unit 103 performs different processes for generating a search image depending on a data structure of dictionary data stored in the dictionary storage 101. Details of the processes for generating a search image will be described later with reference to FIG. 6 and FIG. 7.

The patch search unit 104 searches for a first design image similar to the second design image from the dictionary data stored in the dictionary storage 101, and acquires the similar first design image and a first real image associated with the first design image.

The reference image generation unit 105 receives the second design image from the design image acquisition unit 102, receives the first design image similar to the second design image and the first real image associated with the first design image from the patch search unit 104, and generates a reference image using the first real image. The reference image is a pseudo real image of a second inspection object generated from a plurality of first real images, when there is no defect based on the second design data in the second inspection object.

Specifically, the reference image generation unit 105 specifies a correspondence position where the search image cut from the second design image corresponds to the first design image, and pastes the first real image on the correspondence position in an area where the reference image is generated (hereinafter referred to as "the reference image area"). By performing the process on all areas in the second design image, a reference image serving as a mask for use in, for example, a defect inspection, is designed.

Next, a first example of the dictionary data stored in the dictionary storage 101 will be explained with reference to FIG. 2.

In the first example of the dictionary data, a design patch image 21, which is a partial image of the entire design image based on the first design data, is assumed as the first design image. Furthermore, a real patch image 22, which is a partial image of the entire real image obtained by imaging the first inspection object and corresponds to the design patch image 21, is assumed to be the first real image. FIG. 2 shows an example of the pair of the design patch image 21 and the real patch image 22 corresponding to the design patch image 21, which are stored as the dictionary data. In the description below, when both of the design patch image and the real patch image are intended, they may be simply referred to as patch images.

The size of the design patch image 21 is larger than that of the real patch image 22. An area 23 surrounding the real patch image 22 is the same in size as the design patch image 21. The real patch image 22 is set to a size smaller than the area 23. Specifically, if the real patch image 22 has a size of 5×5 pixels, the design patch image 21 may be set to be larger than the size of 5×5 pixels; for example, a size of 9×9 pixels. Thus, since the design patch image 21 has a relatively large size, it includes information for an image area wider than the real patch image 22.

In the first embodiment, the design patch image 21 and the real patch image 22 are assumed to have a correspondence relationship based upon a common center. For example, if the design patch image 21 has the size of 9×9 pixels, the real patch image corresponds to the area of 5×5 pixels in the central portion of the design patch image 21. However, the embodiment is not limited to this example; for example, the real patch image 22 may correspond to the area of 5×5 pixels in an upper left portion of the design patch image 21. Furthermore, the correspondence relationship between the design patch image 21 and the real patch image 22 may be determined in consideration of imaging conditions, such as an exposure direction.

In this example, the shape of a patch image is assumed to be but not limited to a square, and may be any other rectangle, such as a trapezoid or a parallelogram, or any other polygon, such as a triangle or a polygon having five or more angles. Alternatively, the patch image may have any other shape, such as a circle or a crisscross. For example, the shape of the patch image may be determined depending on the circuit pattern of an inspection object, for example, having many lines, or many curves.

Next, a second example of the dictionary data stored in the dictionary storage 101 will be explained with reference to FIG. 3.

Figure 3:
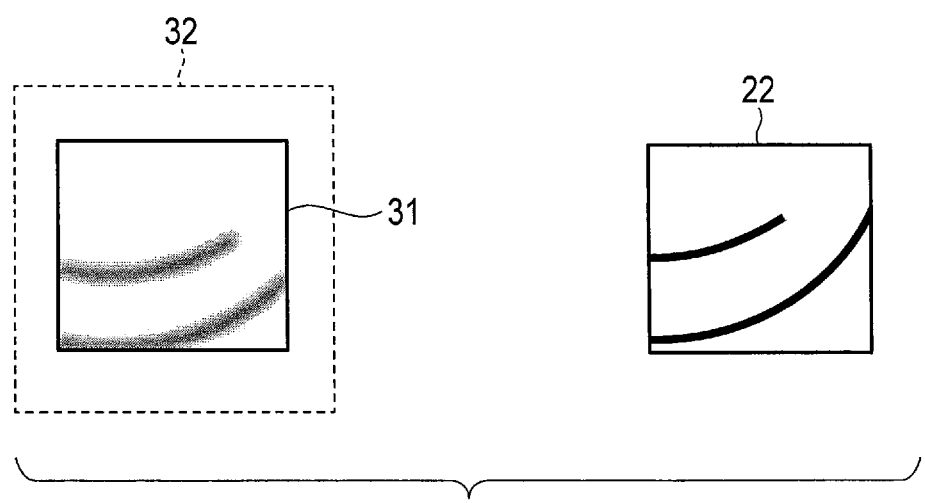
FIG. 3 is a view showing a second example of dictionary data stored in the dictionary storage.

FIG. 3, similarly to FIG. 2, shows a pair of a design patch image and a corresponding real patch image. In FIG. 3, a design patch image 31 is the same in size as the real patch image 22; however, the design patch image 31 is a filtered image, obtained by subjecting an image of an area 32 larger than the design patch image 31 to a filtering process. Thus, the pair of the filtered design patch image 31, which has been subjected to the filtering process, and the real patch image 22 of the same size as the corresponding design patch image 31, is stored as the dictionary data.

The filtering process is assumed to be smooth filtering, such as a moving-average filtering or a Gaussian filtering, but may be of any type of filtering process in which image information (for example, a luminance value and a color information) of the area 32, namely, information on pixels around the design patch image 31 can be included in the design patch image 31. Thus, the design patch image 31 includes information of an image area wider than the real patch image 22.

Next, a third example of the dictionary data stored in the dictionary storage 101 will be explained with reference to FIG. 4 and FIG. 5. In the third example of the dictionary data, an entire image, as opposed to a patch image from the first and second examples, is stored in association with information on a position where a patch image is to be cut.

Figures 4, 5:
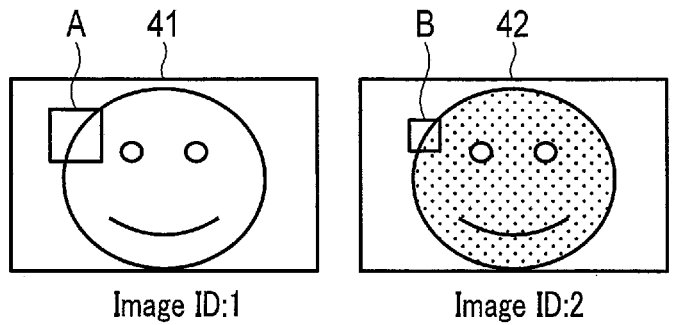
FIG. 4 is a view showing an example of image information, which is a third example of dictionary data stored in the dictionary storage.
FIG. 5 is a view showing an example of position information, which is a fourth example of dictionary data stored in the dictionary storage.

As shown in FIG. 4, in the third example of the dictionary data, a first design image 41 is an entire design image generated based on the first design data, and a first real image 42 is an image that corresponds to the design image 41 and is an entire real image obtained by imaging the first inspection object free of defect. As described above, the first real image 42 is assumed to be an image determined as free of defect, for example, by visual inspection by an inspector. The size of a design patch image cut out from the first design image 41 is larger than that of a real patch image cut out from the first real image 42. Specifically, a size A of the design patch image shown in FIG. 4 is set to be larger than a size B of the corresponding real patch image.

FIG. 5 shows a table indicative of position information respectively specifying a cut-out position of the design patch image cut out from the first design image 41 and a cut position of the real patch image cut out from the first real image 42.

The table shown in FIG. 5 stores an image ID, a patch number, a position, and a patch size in association with one another. The image ID is an identifier to unambiguously identify the first design image 41 or the first real image 42. In the example of FIG. 5, the first design image is represented as "(Design)" and the first real image is represented as "(Real)".

The patch number is a number to identify a design patch image cut out from the first design image 41 or a real patch image cut out from the first real image 42. It is assumed that the design patch image and the corresponding real patch image have the same patch number. However, the design patch image and the real patch image may have any patch numbers, as long as the correspondence relationship between the design patch image and the real patch image can be specified.

The position of the first design image 41 is coordinates of the center of the design patch image based on coordinates defined in the first design image 41. The position of the first real image 42 is coordinates of the center of the real patch image based on coordinates defined in the first real image 42. The positions are not limited to the coordinates of the center of a patch image, but may be any values that can specify a position of the patch image, such as coordinates in an upper left portion of the patch image. The patch size represents the size of a patch image. In this embodiment, in accordance with FIG. 4, the size is predetermined and represented by the symbol "A" or "B", but may be represented by a numerical value designating the size.

Specifically, in the example of FIG. 5, the image ID "1 (Design)", the patch number "0", the position "(x0, y0)", and the patch size "A" are stored in the table in association with one another. For example, when the patch search unit 104 searches for a design patch image, a partial image of the patch size "A" having the center at the coordinates "(x0, y0)" may be cut out from the first design image 41 of the image ID "1 (Design)" as a design patch image of the patch number "0". At this time, a data entry of the image ID "2 (Real)" of the same patch number "0" may be selected as the corresponding design patch image.

Although not shown, also in the third example of the dictionary data, the filtered image as in the second example of the dictionary data may be used as a design patch image. In this case, the size of a filtering area (the area 32 in FIG. 3) to be subjected to the filtering process can be stored as the patch size.

Specifically, it is assumed that the patch size "A" in FIG. 5 is the size of a filtering area, and the patch search unit 104 searches for a design patch image. The patch search unit 104 may determine a filtering area of the patch size "A" having the center at the coordinates "(x0, y0)" from the first design image 41 of the image ID "1 (Design)", perform the filtering process on the filtering area, and cut out a partial image corresponding to the patch size "B" as the design patch image of the patch number "0". Alternatively, the filtering process may be performed in advance on the first design image 41 in its entirety, and a design patch image of the same size as the real patch image may be cut out.

Figure 6:
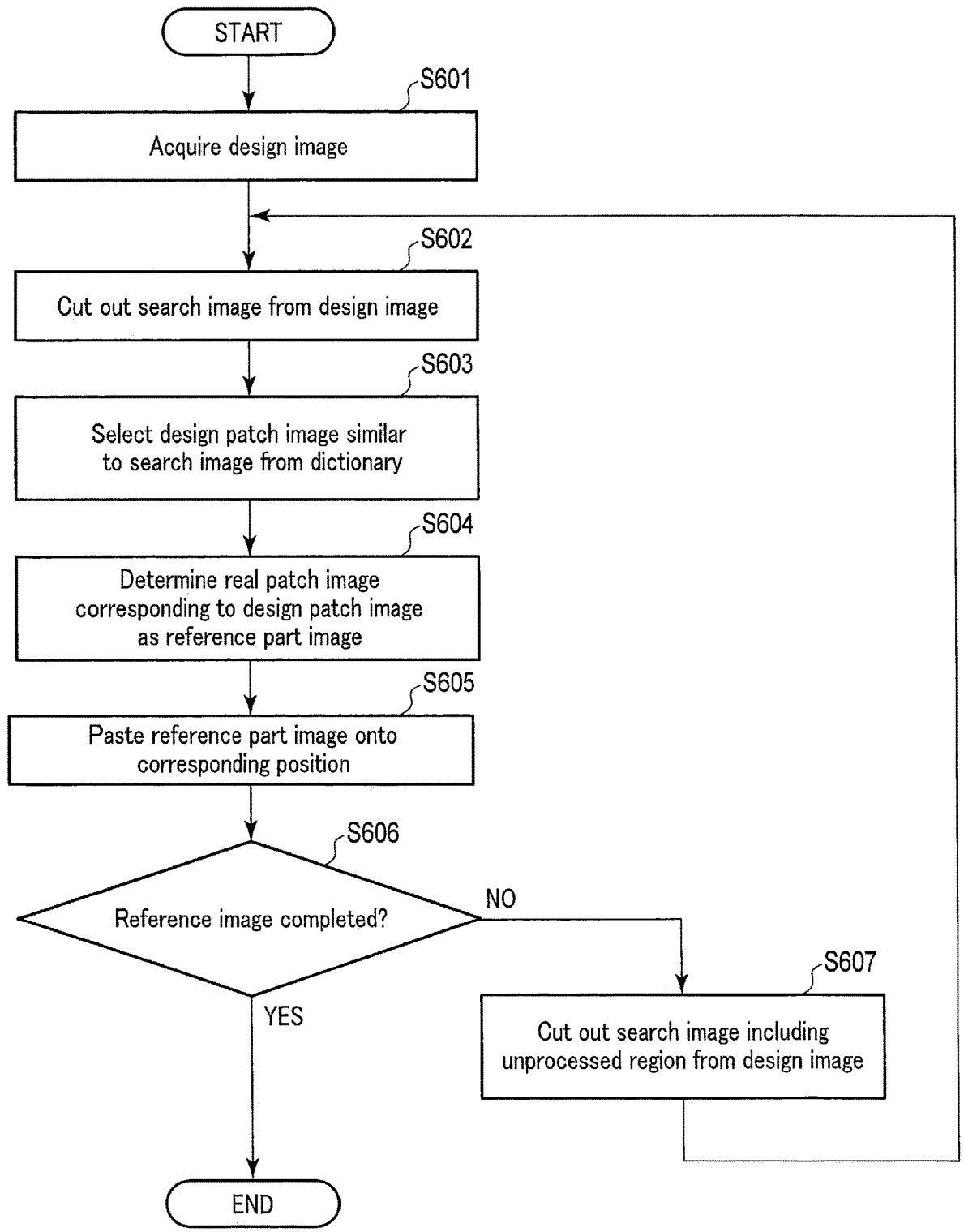
FIG. 6 is a flowchart showing a first example of operations of the defect inspection apparatus according the first embodiment.

Next, a first example of operations of the defect inspection apparatus 10 according to the first embodiment will be described with reference to the flowchart of FIG. 6. In the first example, it is assumed that the size of the design patch image stored in the dictionary storage 101 is larger than that of the real patch image.

In step S601, the design image acquisition unit 102 acquires the second design image.

In step S602, the search image generation unit 103 cuts out a search image from the second design image.

In step S603, the patch search unit 104 searches for a design patch image similar to the search image, and selects a similar design patch image. In this embodiment, it is assumed that a design patch image having a highest degree of similarity with the search image is selected as a similar design patch image; however, a plurality of design patch images may be chosen in descending order of the degree of similarity, and an average image may be chosen as a similar design patch image. The search method may be any method similar to pattern matching, as long as it calculates a degree of similarity between images, such as a sum of squared difference (SSD) or a sum of absolute difference (SAD) relating to a difference between pixel values of a search image and a design patch image.

If the dictionary storage 101 stores, as the dictionary data, a plurality of design patch images and corresponding real patch images, the patch search unit 104 can perform pattern matching on a search image and each of the design patch images, and can select a design patch image having the greatest similarity as the design patch image similar to the search image.

Furthermore, if the dictionary storage 101 stores, as the dictionary data, a design image and position information on cut-out positions where a plurality of design patch images are cut out, the patch search unit 104 can sequentially cut out the design patch images in accordance with the position information, and can perform pattern matching on the search image and the cut design patch images.

In step S604, the patch search unit 104 determines as a reference part image a real patch image corresponding to the design patch image selected in step S603.

In step S605, the reference image generation unit 105 pastes (locates) the reference part image on a corresponding position in the reference image area that corresponds to the cut-out position where the search image is cut out. For example, the center position of the reference part image can be positioned to the coordinates of the center of a cut-out position from which the search image is cut out in step S602, and the reference part image can be located to the corresponding position in the reference image area.

In step S606, the reference image generation unit 105 determines whether a reference image has been completed. Whether a reference image has completed can be determined by determining whether one reference image has completed by cutting all pixels from the second design image as a part of the search image, and locating the reference part image corresponding to the search image on the reference image area. If the reference image has completed, the process is ended, and if the reference image has not completed, the flow proceeds to step S607.

In step S607, the search image generation unit 103 cuts out a search image including an unprocessed area from the second design image, the flow returns to step S602, and a similar process is repeated. As a method of cutting out a search image, for example, it is assumed that raster scanning is started from an uppermost left pixel of the second design image, and a search image can be shifted one pixel by one pixel to the right and sequentially cut off. When the search image at the right end of the second design image has been cut, a search image including a left end pixel and one pixel shifted down from the uppermost left end pixel can be cut out.

As in the third example of the dictionary data described above, when the entire first design image and the position information are stored as the dictionary data, pattern matching may be performed on the entire first design image by the search image, and not through cutting a design patch image based on the position information, so that whether there is a similar part image may be determined by a search on all areas.

Figure 7:
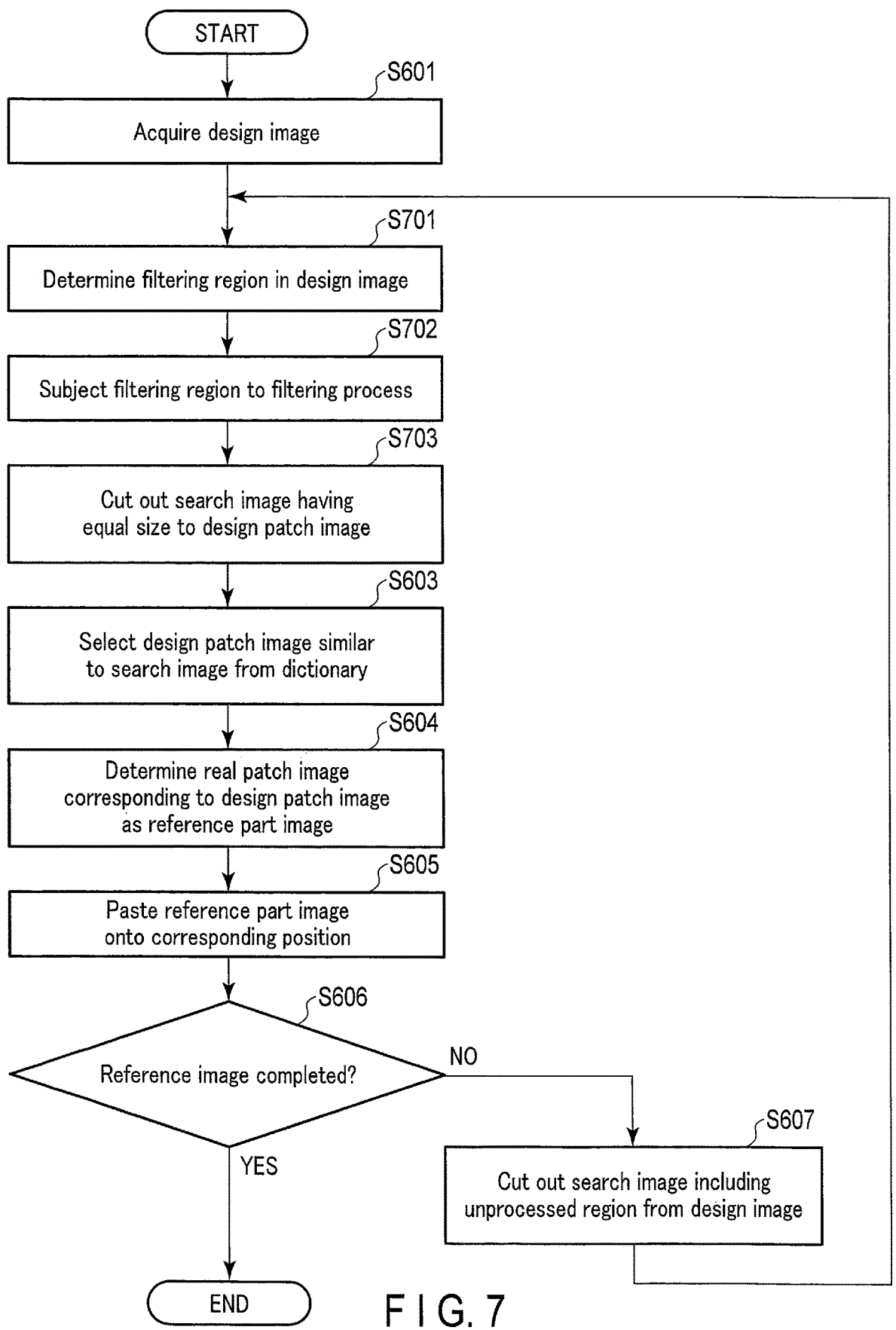
FIG. 7 is a flowchart showing a second example of operations of the defect inspection apparatus according the first embodiment.

Next, a second example of operations of the defect inspection apparatus 10 according to the first embodiment will be described with reference to the flowchart of FIG. 7. In the second example, a case is assumed in which the dictionary storage 101 stores a design patch image that has been subjected to the filtering process. The processes in step S601, and step S603 to step S607 are the same as those shown in FIG. 6, and explanations thereof will be omitted.

In step S701, the search image generation unit 103 determines a filtering area for generating a search image in the design image. The filtering area has a size equal to that of the filtering area set in the design patch image stored in the dictionary storage 101.

In step S702, the search image generation unit 103 subjects the filtering area to the filtering process.

In step S703, the search image generation unit 103 may cut out a search image having the size equal to that of the design patch image from the design image after the filtering process.

Concepts of a reference image generation process by the defect inspection apparatus 10 according to the first embodiment will now be described with reference to FIG. 8.

Figure 8:
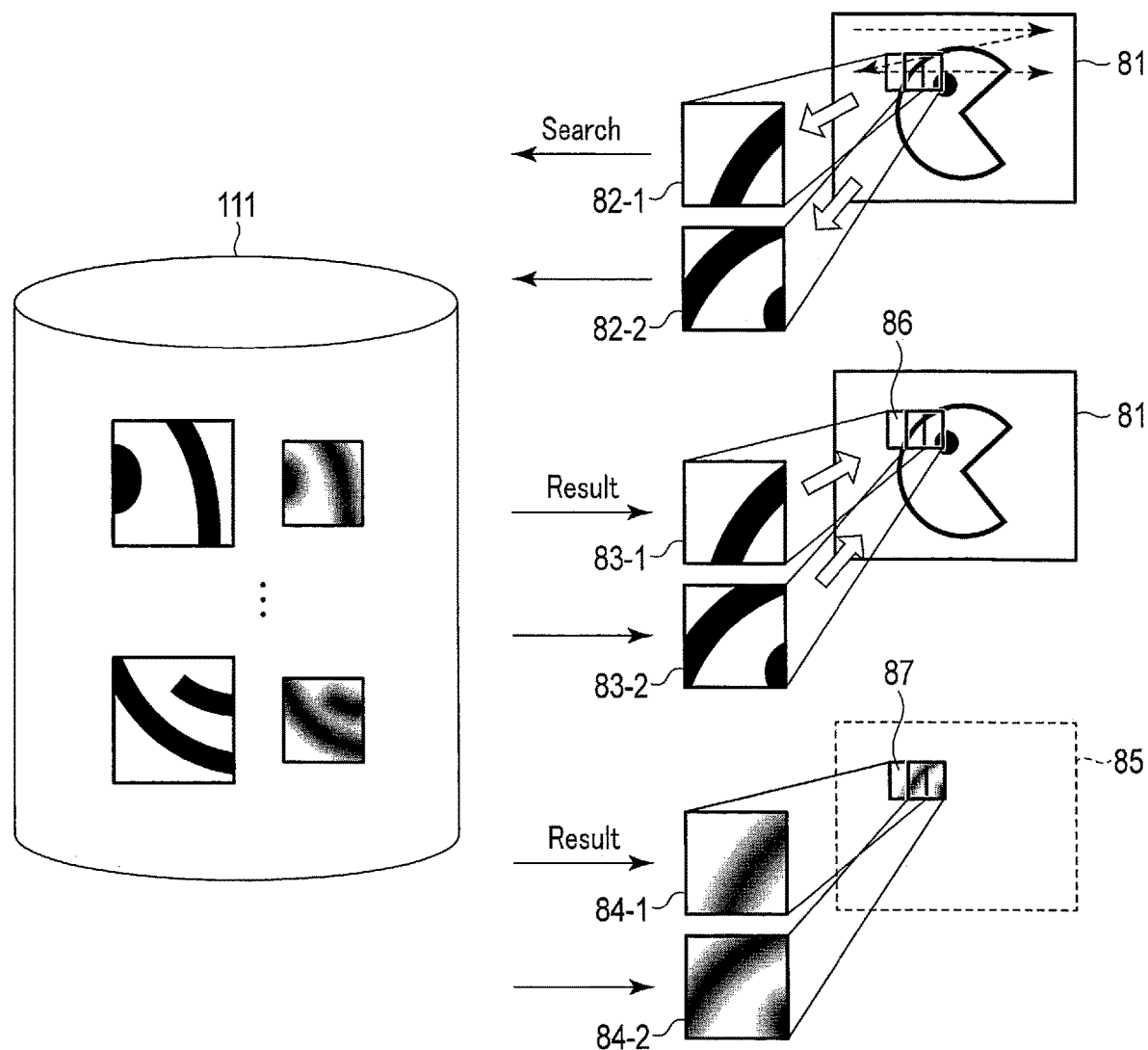
FIG. 8 is a schematic view showing a process of generating a reference image by the defect inspection apparatus according to the first embodiment.

FIG. 8 is based on the assumption that the defect inspection apparatus 10 generates a reference image of a design image 81. First, the search image generation unit 103 cuts out a search image 82-1. The patch search unit 104 searches for a design patch image similar to the search image 82-1 from the dictionary stored in the dictionary storage 101.

In this case, it is assumed that the patch search unit 104 acquires a design patch image 83-1 similar to the search image 82-1 and a corresponding real patch image 84-1. The reference image generation unit 105 pastes the real patch image 84-1 as a reference part image on a corresponding position 87 corresponding to a cut-out position 86, from which the search image 82-1 has been cut out, in a reference image area 85, to be a reference image. In this way, the process concerning one search image 82-1 ends.

Subsequently, the search image generation unit 103 cuts out, as a next search image 82-2, for example, an area one pixel shifted to the right of the area where the immediately preceding search image 82-1 has been extracted. Then, a design patch image 83-2 and a corresponding real patch image 84-2 are acquired in the same manner, and similar processes are sequentially performed until the reference image generation unit 105 pastes the real patch image 84-2 as a reference part image on a reference image area 85. Since the cut-out search image 82-2 overlaps the search image 82-1, the real patch image 84-2 as the reference part image is pasted on the real patch image 84-1 in an overlapping manner.

In this example, search images 82 are sequentially acquired by raster scanning from the upper left end of the design image 81 as a starting point to the lower right end of the design image 81 as an ending point, so that a reference image can ultimately be generated. When a search image 82 is to be cut out from one of the four corner areas of the design image 81, the search image generation unit 103 can ensure a size of the search image to be the same as the size of the other search images 82 by, for example, copying the pixel value of an end portion of the design image 81.

A first example of the process of generating a reference image will now be described with reference to FIG. 9.

Figure 9:
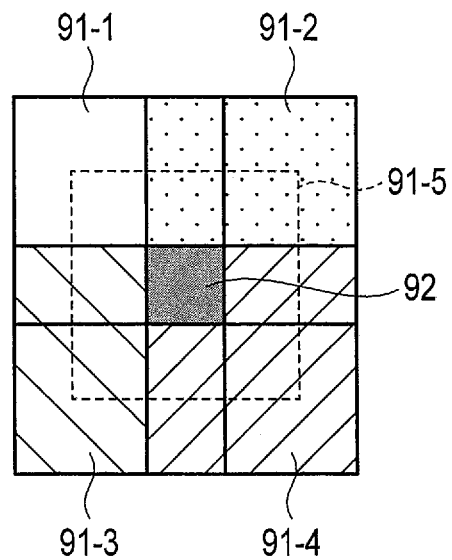
FIG. 9 is a view showing a first example of the process of generating a reference image.

FIG. 9 is a view showing a state in which a plurality of reference part images 91 are pasted on an area of a part of the reference image area 85 shown in FIG. 8. In the example shown in FIG. 9, five reference part images 91-1 to 91-5 are pasted in an overlapping manner. The reference image generation unit 105 determines an average value of pixel values of the overlapping reference part images 91 as a pixel value of the reference image at a pixel position 92. In this example, since five pixel values overlap at the pixel position 92, an average value of the five pixel values can be determined as the pixel value at the reference position 92. Thus, by determining the average value of pixel values of a plurality of reference part image as a pixel value at the pixel position 92, the image quality of the reference image can be improved.

Furthermore, if a similarity of the design patch image to the search image has been calculated, the pixel value may be weighted depending on that similarity. For example, if the similarity to the search image of the design patch image corresponding to the reference part image 91-1 is higher than the similarity to the search image of the design patch image corresponding to the reference part image 91-2, the weight of the pixel value of the reference part image 91-1 may be set to be greater than that of the pixel value of the reference part image 91-2 to calculate a weighted average, so that the pixel value at the pixel position 92 can be determined.

Furthermore, the pixel value can be weighted depending on a distance from the center position of the reference part image. For example, when a pixel value at the pixel position 92 is to be calculated, the pixel position 92 is located at the center of the reference part image 91-5, and at the lower right of the reference part image 91-1. Therefore, the weight of the pixel value of the reference part image 91-5 is set to be greater than that of the pixel value of the reference part image 91-1 to calculate a weighted average, so that the pixel value at the pixel position 92 can be determined.

Furthermore, depending on the search image, the process of superimposing reference part images and calculating an average value may not necessarily be performed. For example, if an area of a background or the like is cut out as a search image, reference part images need not be superimposed and one real patch image may be pasted as a reference part image, since the pixel values of the background are generally constant. Therefore, if the search image satisfies a predetermined condition, the reference image generation unit 105 may use one real patch image as a reference part image without pasting another reference part image in the reference image area.

A second example of the process of generating a reference image will now be described with reference to FIG. 10. In the example shown in FIG. 10, a position where a reference part image is pasted is set with a decimal fraction pixel precision (sub-pixel precision).

The reference image generation unit 105 pastes a real patch image associated with a similar design patch image selected from the dictionary data on the corresponding position, thereby generating a reference image. However, in some cases, the search image and the design patch image may be different in phase. In such a case, the design patch image may correspond to the second design image with a higher precision at a position slightly deviated from where the search image has been actually cut out, namely, by adjusting the position in units of sub-pixels rather than in units of pixels. Therefore, the reference image generation unit 105 positions a similar design patch image with a sub-pixel precision on the second design image from which the search image has been cut out, so that an optimum pasting position can be determined.

Figure 10:
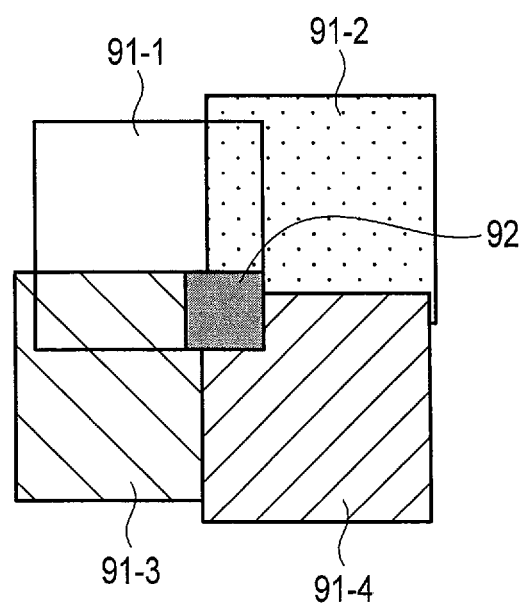
FIG. 10 is a view showing a second example of the process of generating a reference image.

As shown in FIG. 10, as a result of pasting the similar design patch image on the second design image with the sub-pixel precision, a reference part image can be pasted at the determined corresponding position. In the example shown in FIG. 10, the reference part images 91-2 to 91-4 are pasted at the pixel position 92 with the sub-pixel precision, and not with the pixel precision. Accordingly, the phase shift can be absorbed, so that the precision of the reference image can be further improved.

The design patch image may be stored in the dictionary storage 101 in a state in which the resolution thereof is higher and the size thereof is larger than those of the real patch image and the search image. In this case, the design patch image cannot be compared with the search image due to the difference in resolution; therefore, the design patch image need be reduced to the same size as the search image and thereafter, pattern matching may be performed.

Specifically, an example of pattern matching of the reduced design patch image and the search image will be described with reference to FIG. 11.

Figure 11:
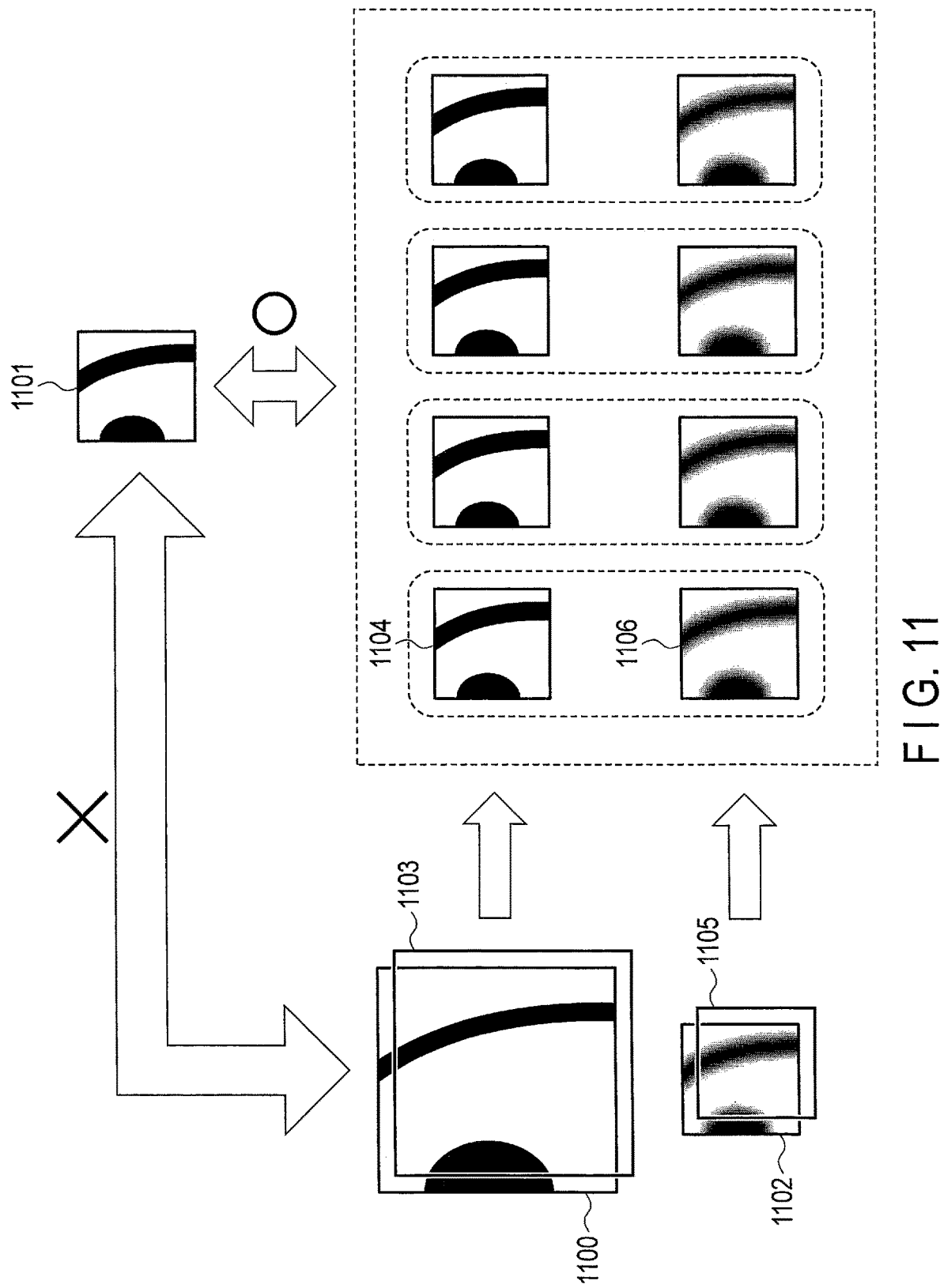
FIG. 11 is a view showing an example of performing pattern matching by reducing a design patch image.

FIG. 11 is a schematic view of pattern matching of a design patch image 1100 and a search image 1101. In the example shown in FIG. 11, the resolution of the design patch image 1100 is assumed to be double those of the search image 1101 and a real patch image 1102. Since the design patch image 1100 has horizontal and vertical sizes double those of the search image 1101, the search image 1101 and the design patch image 1100 cannot be directly compared with each other.

Therefore, for example, the patch search unit 104 reduces the design patch image 1100 until the design patch image 1100 becomes the same in resolution, namely, the same in size as the search image 1101. In the example shown in FIG. 11, since the resolution of the design patch image 1100 is twice that of the search image 1101, the horizontal and vertical sizes of the design patch image 1100 included in a subject area 1103 are halved. As a result, the reduced design patch image (hereinafter also referred to as the "reduced design patch image 1104") having the same resolution as the search image 1101 is generated.

To absorb the phase shift that may occur when the image is reduced, the subject area 1103 is shifted from the design patch image 1100 by one pixel to meet the reduced pixel size, and a plurality of reduced design patch images 1104 are generated. In the example shown in FIG. 11, since the area of 2×2 pixels of the design patch image 1100 corresponds to the area of one pixel of the search image 1101, four reduced design patch images 1104 are generated. Specifically, the reduced design patch images 1104 are respectively generated from an area identical to the design patch image 1100, an area shifted by one pixel to the right from the design patch image 1100, an area shifted by one pixel down from the design patch image 1100, and an area shifted by one pixel to the right and one pixel down from the design patch image 1100.

On the other hand, four real patch images 1106, each being paired with the corresponding reduced design patch image 1104, are generated from the real patch image 1102 corresponding to the design patch image 1100. Since one pixel of the design patch image 1100 corresponds to a half pixel of the real patch image 1102, a subject area 1105 for a real patch image is shifted by a half pixel, and four real patch images 1106 are generated in the same manner as in the case of the design patch image 1100.

Thus, since the resolution of the reduced design patch image 1104 becomes the same as that of the search image 1101, pattern matching of the reduced design patch image 1104 and the search image 1101 can be performed, while the phase shift due to image reduction can be absorbed.

Pairs of the reduced design patch images 1104 and the corresponding real patch images 1106 may be generated when performing the pattern matching, or prepared in advance during preparation of the dictionary data.

In the case where the patch search unit 104 reduces the design patch image 1100, information on the resolution of the design patch image 1100 and the real patch image 1102 is stored in the dictionary data in advance. The patch search unit 104 receives, from the search image generation unit 103, the information on the resolution of the search image 1101 when the search image is generated, and can reduce the design patch image 1100 to the same resolution as the search image 1101 based on the information on the resolution of the design patch image 1100 stored in the dictionary data.

Also with regard to the real patch image 1102, the patch search unit 104 can generate the real patch image 1106 corresponding to the reduced design patch image 1104 based on the relationship between the resolution of the design patch image 1100 and the resolution of the real patch image 1102. Thus, the phase shift between images can be absorbed by the information in the dictionary data if the relationship between the resolutions of the design patch image and the real patch image is stored in advance.

An example of the data structure of the dictionary data will now be described with reference to FIG. 12.

Figure 12:
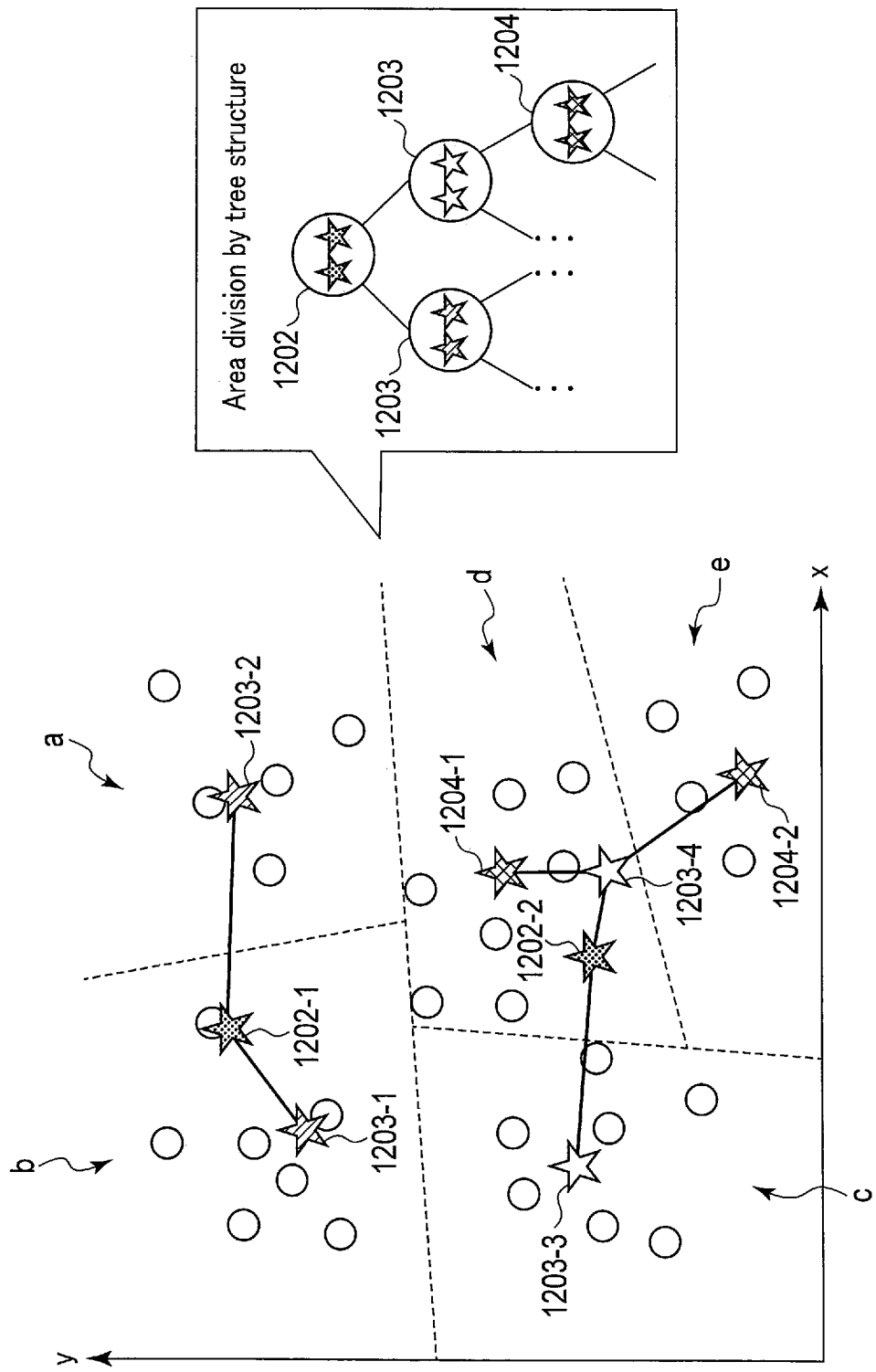
FIG. 12 is a schematic view for explaining an example of a tree structure of dictionary data.

FIG. 12 is a plotted diagram in which design patch images included in the dictionary data are plotted and classified by two axes depending on the pattern. The plotted diagram illustrates that the shorter the distance between plots, the more similar the design patch images are. In FIG. 12, the design patch images are clustered depending on the similarities of patterns, and divided into a plurality of small areas defined by design patch image broken lines and the coordinate axes. In the example shown in FIG. 12, the small areas are associated with one another by tree structures. In other words, the dictionary data is stored with the tree structures.

In each of the small areas, a representative point is determined. The representative point is an image indicating a pattern that represents a plurality of design patch images 1201 included in the small area. It may be one selected from the design patch images included in the small area, or a new calculated image, such as an average image of the design patch images. The tree structures are formed by using the representative points as nodes.

Specifically, in the example shown in FIG. 12, both a representative point 1202-1, representing small areas a and b, and a representative point 1202-2, representing small areas c, d, and e, are formed as nodes of the same layer. As lower layers of the representative points 1202-1, a representative point 1203-1, representing the small area b, and a representative point 1203-2, representing the small area a, are formed as nodes of the same layer. Similarly, as lower layers of the representative points 1202-2, a representative point 1203-3, representing the small area c, and a representative point 1203-4, representing the small areas d and e, are formed as nodes of the same layer. Furthermore, as lower layers of the representative points 1203-4, a representative point 1204-1, of the small area d, and a representative point 1204-2, of the small area e, are formed as nodes of the same layer.

An example in which the patch search unit 104 searches for a design patch image based on the tree structure will now be described with reference to FIG. 13.

Figure 13:
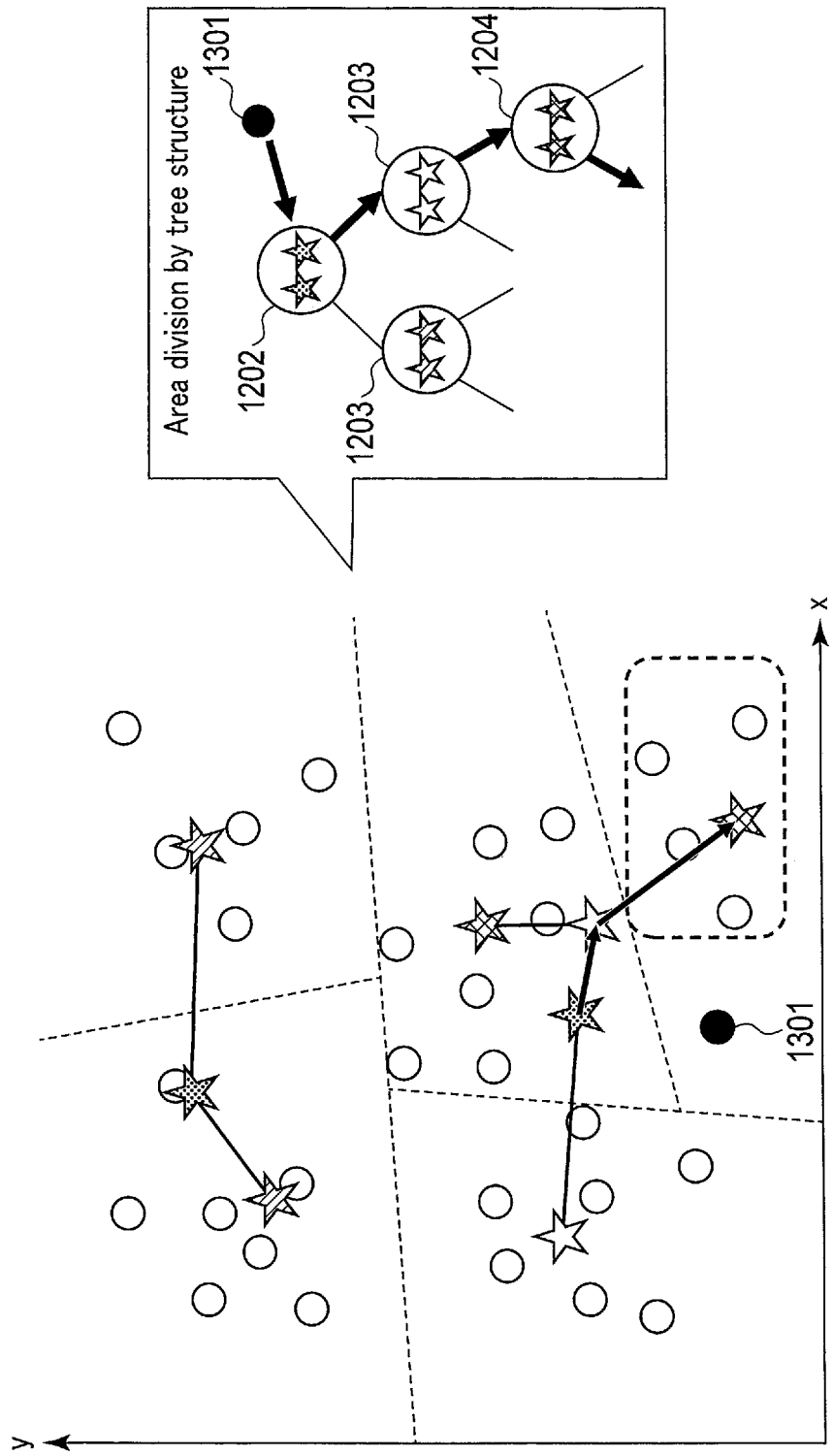
FIG. 13 is a schematic view for explaining a search example based on the tree structure of dictionary data.

FIG. 13 shows a tree structure of dictionary data similar to that shown in FIG. 12. The patch search unit 104 compares a search image 1301 with representative points forming the nodes of the tree structure, and sequentially tracks nodes of similar patterns toward lower layers. Specifically, in the example shown in FIG. 13, similarities between the search image with two representative points 1202-1 and 1202-2 in the uppermost layer of the tree structure are compared, and for example, distances between the search image and the representative points are calculated. In this example, it is assumed that the distance between the representative point 1202-2 and the search image is shorter (namely, the similarity therebetween is higher), and the patch search unit 104 calculates distances between the search image and representative points (1203-3 and 1203-4) in a layer below the representative point 1202-2. It is assumed that the distance between the representative point 1203-4 and the search image is shorter, and similarly, the patch search unit 104 calculates distances between the search image and representative points (1204-1 and 1204-2) in a layer below the representative point 1203-4. Finally, assuming that the distance between the representative point 1204-2 and the search image is shorter, the patch search unit 104 can calculate a distance between the search image and a design patch image only in the small area e including the representative point 1204-2, as indicated by an area encircled by a broken line in FIG. 13.

As described above, according to the tree structure shown in FIG. 12 and FIG. 13, when the patch search unit 104 searches for a real patch image similar to the search image, it traces design patch images having similar patterns in the tree structure. Thus, the number of searches (calculations of distances) can be reduced by sequentially tracing down from the upper most layer of the tree structure. The more the data items are stored in the dictionary data, the more the practical advantages are obtained, the more the search time can be reduced, and the more the search efficiency can be improved.

In the step of constructing or updating the tree structure, it is necessary that only one pair of the same, or duplicate node images exist. Therefore, a plurality of node images (design patch images and the corresponding real patch images) having a similarity in image equal to or higher than a threshold value may be deleted. Furthermore, the node images may be subjected to a leveling process. For example, the design patch image, which is a node image, is unchanged in the step of constructing or updating the tree structure. However, since the corresponding real patch image is an actual real image, it may vary in luminance or the like. Therefore, by using one node image having a similarity in image equal to or greater than the threshold value, real patch images associated with a design patch image (node image) are averaged, thereby reducing the node images and reducing the data size of the dictionary data.

In the examples shown in FIG. 12 and FIG. 13, it is assumed that the tree structure is based on similarities in shape of inspection objects included in the patch image (concavities and convexities, curvatures (linear or curved), etc.). However, the tree structure may be constructed based on another index of similarities, such as distribution of luminance values, and stored as the dictionary data.

In the examples shown in FIG. 12 and FIG. 13, the similarity between the search image and a representative point in the small area is used at a branch at the node of the tree structure; however, any other rule is applicable as long as it can determine to which small area the search image belongs. For example, a hyperplane that divides areas may be utilized. In this case, a similar process can be performed by storing the hyperplane instead of the representative point at each node.

Besides, a search can be efficiently performed by another method without the use of a tree structure. For example, the representative point (1203-1, 1203-2, 1203-3, 1204-1, or 1204-2) of the smallest areas in FIG. 12 may be stored in advance. When the patch search unit 104 performs a search, a distance between a search image and each representative point is calculated, so that the small area to which the search image belongs can be specified.

According to the first embodiment described above, a second design patch image similar to a search image, which is a partial image of a second design image, is searched for from a plurality of first design patch images including information on an image area wider than a first real patch image, and a reference image, which is a pseudo real image free of defect, is generated by using the first real patch image. Thus, an appropriate real patch image can be selected regardless of imaging conditions of real images included in the dictionary data. As a result, a high-precision reference image can be generated to support a high-precision defect inspection.

Second Embodiment

In the second embodiment, a defect inspection is performed on a real image of an inspection object using a reference image.

A defect inspection apparatus according to the second embodiment will be explained with reference to the block diagram of FIG. 14.

A defect inspection apparatus 10 of the second embodiment includes a dictionary storage 101, a design image acquisition unit 102, a search image generation unit 103, a patch search unit 104, a reference image generation unit 105, a real image acquisition unit 106, an estimation unit 107, and a dictionary update unit 108.

The dictionary storage 101, the design image acquisition unit 102, the search image generation unit 103, the patch search unit 104, and the reference image generation unit 105 are the same as those of the first embodiment, and explanations thereof are omitted here.

The real image acquisition unit 106 acquires, for example, from outside, a second real image which is obtained by imaging a second inspection object produced based on second design data (or a second design image).

The estimation unit 107 receives the second real image from the real image acquisition unit 106 and the reference image generated based on the second design image from the reference image generation unit 105, and superimposes the reference image as a mask on the second real image. If a difference in pixel value between the reference image and the second real image is equal to or greater than a threshold value, the estimation unit 107 estimates that the second real image is defective.

The dictionary update unit 108 updates the dictionary data when an estimation result is incorrect. For example, if the estimation unit 107 determines there is a defect when, in fact, no defect is present, it is considered that a reference image of the corresponding portion is defective and the dictionary data does not contain a pair of a real patch image and a design patch image corresponding to the partial image of the second real image determined to be defective. Thus, the dictionary update unit 108 acquires a pair of the real patch image and the second design patch image relating to that portion and updates the dictionary.

The dictionary update unit 108 may perform maintenance for the dictionary data. For example, when the defect inspection apparatus 10 performs inspections a plurality of times, the dictionary update unit 108 can calculate a frequency of a selection of each patch image in the dictionary data. Thus, the dictionary update unit 108 may delete a pair of a real patch image and a design patch image selected as being similar to the search image at a frequency equal to or lower than the threshold value from the dictionary data.

If the dictionary data stores an entirety of a design image and the corresponding real image, and position information specifying a cut-out position, the dictionary update unit 108 may store in the dictionary data a composite image obtained by pasting a design patch image on a cut-out position of another design patch image selected at a frequency equal to or lower than the threshold value. The design image itself is a group of partial images that do not represent any inspection object, but wasteful image areas can be effectively utilized. The maintenance of the dictionary data described above can reduce the patch images and the amount of data in the dictionary data, while the precision of the dictionary can be maintained.

According to the second embodiment described above, a defect inspection is performed on the second real image obtained by imaging an inspection object using the reference image generated based on the second design image as a mask, and a high-precision defect inspection can be realized. Furthermore, the maintenance of the dictionary data based on an estimation result for a defect can maintain the precision of the dictionary while the amount of data in the dictionary data can be reduced. Thus, the embodiment can support a high-precision defect inspection.

FIG. 15 shows an example of a hardware configuration of the defect inspection apparatus 10 according to the embodiment.

The defect inspection apparatus 10 includes a central processing unit (CPU) 51, a random access memory (RAM) 52, a read only memory (ROM) 53, a storage 54, a display 55, an input device 56, and a communication device 57, all of which are connected by a bus.

The CPU 51 is a processor that executes a calculation process and a control process in accordance with programs. The CPU 51 executes various processes using a predetermined area of the RAM 52 as a work area in cooperation with programs stored in the ROM 53 and the storage 54.

The RAM 52 is a memory, such as a synchronous dynamic random access memory (SDRAM). The RAM 52 functions as a work area of the CPU 51. The ROM 53 is a memory storing programs and various information in a non-rewritable manner.

The storage 54 is a device that writes and reads data in and from a magnetic recording medium, such as a hard disk drive (HDD), a semiconductor storage medium, such as a flash memory, a magnetically recordable storage medium, such as an HDD, or an optically recordable storage medium. The storage 54 writes and reads data in and from the storage medium under the control of the CPU 51.

The display 55 is a display device, such as a liquid crystal display (LCD). The display 55 displays various information based on a display signal from the CPU 51.

The input device 56 is an input device, such as a mouse and a keyboard. The input device 56 receives information input via user operations, and outputs an instruction signal to the CPU 51.

The communication device 57 communicates with an external device through a network under the control of the CPU 51.

The flowcharts of the embodiments illustrate methods and systems according to the embodiments. It is to be understood that the embodiments described herein can be implemented by hardware, circuit, software, firmware, middleware, microcode, or any combination thereof. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel apparatuses, methods and computer readable media described herein may be embodied in a variety of other forms; furthermore, various omissions, substitutions and changes in the form of the apparatuses, methods and computer readable media described herein may be made without departing from the spirit of the inventions. The accompanying claims and their equivalents are intended to cover such forms or modifications as would fall within the scope and spirit of the inventions.

What is claimed is:

1. A defect inspection apparatus comprising:
 a storage configured to store dictionary data in which a first design image based on first design data generated by designing software is associated with a first real image corresponding to the first design image, the first real image being obtained by imaging a first inspection object free of defect and produced based on the first design data; and
 a processor configured to:
 acquire a second design image based on second design data generated by the designing software;
 search for a similar first design image similar to the second design image with reference to the dictionary data; and
 generate a reference image that is a pseudo real image of a second inspection object, based on the second design data and free of defect, by using the first real image associated with the similar first design image, wherein the first design image includes information of an image area wider than the first real image.

2. The apparatus according to claim 1, wherein the first design image has a size larger than that of the first real image.

3. The apparatus according to claim 1, wherein the first design image is an image obtained by subjecting an area greater than the first real image to a filtering process so as to include information of a pixel around the first design image.

4. The apparatus according to claim 1, wherein
the first design image is a partial image of an entire design image based on the first design data,
the first real image is a partial image of an entire real image corresponding to the first design image, and
the entire real image is obtained by imaging the first inspection object.

5. The apparatus according to claim 1, wherein the storage stores, as the dictionary data, an entire design image, first position information, an entire real image and second position information associated with each other, the entire design image being based on the first design data, the first position information specifying a cut-out position from the entire design image as the first design image, the entire real image being obtained by imaging the first inspection object free of defect, and the second position information specifying a cut-out position from the entire real image as the first real image.

6. The apparatus according to claim 1, wherein
The processor is further configured to:
acquire a second real image obtained by imaging a second inspection object produced based on the second design data; and
compare the second real image and the reference image and estimate a defect position of the second inspection object.

7. The apparatus according to claim 1, wherein
the processor cuts out a search image that is a part of the second design image,
searches for a similar first design image similar to the search image; and
generates the reference image by pasting a first real image associated with the similar first design image on a cut-out position of the search image.

8. The apparatus according to claim 7, wherein the processor calculates a pixel value at a pixel position in the reference image by weighting a pixel value of each of the first real images at the pixel position on which a plurality of first real images are superimposed, in accordance with a distance from a center of each first real image.

9. The apparatus according to claim 7, wherein the processor calculates a pixel value at a pixel position in the reference image by weighting a pixel value of each of the first real images at the pixel position on which a plurality of first real images are superimposed, in accordance with a similarity between the search image and the first design image.

10. The apparatus according to claim 7, wherein
the processor determines a corresponding position by positioning the similar first design image to the cut-out position with a decimal fraction pixel precision and
pastes the first real image associated with the similar first design image on the corresponding position.

11. The apparatus according to claim 1, wherein the storage stores the dictionary data in which a plurality of first design images represent by a tree structure and a plurality of first design images having a similarity in image equal to or higher than a threshold value are deleted or leveled in a step of constructing or updating the tree structure.

12. The apparatus according to claim 1, wherein
the storage stores the dictionary data in which a plurality of first design images represent by a tree structure and
first real images respectively associated with the first design images having a similarity in image equal to or higher than a threshold value are averaged in a step of constructing or updating the tree structure.

13. The apparatus according to claim 1, wherein
the processor is further configured to delete a first design image selected as the similar first design image at a frequency equal to or lower than a threshold value and a corresponding first real image from the dictionary data.

14. The apparatus according to claim 1, wherein the storage stores, as the entire design image, a composite image obtained by pasting a partial image of another first design image on the cut-out position of the first design image, selected as the similar first design image at a frequency equal to or lower than a threshold value.

15. A defect inspection method comprising:
storing, in a storage, dictionary data in which a first design image based on first design data generated by designing software is associated with a first real image corresponding to the first design image, the first real image being obtained by imaging a first inspection object free of defect and produced based on the first design data;
acquiring a second design image based on second design data generated by the designing software;
searching for a similar first design image similar to the second design image with reference to the dictionary data; and
generating a reference image that is a pseudo real image of a second inspection object, based on the second design data and free of defect, by using the first real image associated with the similar first design image, wherein
the first design image includes information of an image area wider than the first real image.

16. A non-transitory computer readable medium including computer executable instructions, wherein the instructions, when executed by a processor, cause the processor to perform a method comprising:
storing, in a storage, dictionary data in which a first design image based on first design data generated by designing software is associated with a first real image corresponding to the first design image, the first real image being obtained by imaging a first inspection object free of defect and produced based on the first design data;
acquiring a second design image based on second design data generated by the designing software;
searching for a similar first design image similar to the second design image with reference to the dictionary data; and
generating a reference image that is a pseudo real image of a second inspection object, based on the second design data and free of defect, by using the first real image associated with the similar first design image, wherein
the first design image includes information of an image area wider than the first real image.

* * * * *